United States Patent
Choy et al.

(10) Patent No.: US 9,331,329 B2
(45) Date of Patent: *May 3, 2016

(54) CARBON-COATED LITHIUM IRON PHOSPHATE OF OLIVINE CRYSTAL STRUCTURE AND LITHIUM SECONDARY BATTERY USING THE SAME

(71) Applicant: LG CHEM, LTD., Seoul (KR)

(72) Inventors: Sang Hoon Choy, Daejeon (KR); Yong Tae Lee, Jeonju-si (KR); Hong Kyu Park, Daejeon (KR); Sung-Kyun Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/623,570

(22) Filed: Sep. 20, 2012

(65) Prior Publication Data

US 2013/0216902 A1    Aug. 22, 2013

Related U.S. Application Data

(63) Continuation of application No. PCT/KR2011/002829, filed on Apr. 20, 2011.

(30) Foreign Application Priority Data

Apr. 21, 2010    (KR) .................. 10-2010-0036760

(51) Int. Cl.
*H01M 4/02* (2006.01)
*H01M 4/36* (2006.01)
(Continued)

(52) U.S. Cl.
CPC .......... *H01M 4/131* (2013.01); *B60L 11/1879* (2013.01); *C01B 25/375* (2013.01); *C01B 25/45* (2013.01); *H01M 4/5825* (2013.01);
(Continued)

(58) Field of Classification Search
USPC ................... 429/209–246; 29/623.1–623.5
See application file for complete search history.

(56) References Cited

U.S. PATENT DOCUMENTS

2008/0241690 A1    10/2008    Delacourt et al.
2010/0227221 A1    9/2010    Chang et al.
(Continued)

FOREIGN PATENT DOCUMENTS

CN    101567441 A    10/2009
EP    2 211 404 A1    7/2010
(Continued)

OTHER PUBLICATIONS

Machine Translation of Lee et al. (KR 10-2007-0108664, published Oct. 2007).*

(Continued)

*Primary Examiner* — Basia Ridley
*Assistant Examiner* — Caitlin Wilmot
(74) *Attorney, Agent, or Firm* — Birch, Stewart, Kolasch & Birch, LLP (57) ABSTRACT

Disclosed is a lithium iron phosphate with an olivine crystal structure wherein the lithium iron phosphate has a composition represented by the following Formula 1 and carbon (C) is coated on the surface of the lithium iron phosphate by chemical bonding via a heterogeneous element other than carbon. $Li_{1+a}Fe_{1-x}M_x(PO_{4-b})X_b$ (1) (wherein M, X, a, x, and b are the same as defined in the specification).

18 Claims, 4 Drawing Sheets

(A)

(B)

(51) Int. Cl.
  *H01M 4/52* (2010.01)
  *H01M 4/131* (2010.01)
  *B60L 11/18* (2006.01)
  *H01M 4/58* (2010.01)
  *C01B 25/45* (2006.01)
  *H01M 4/62* (2006.01)
  *C01B 25/37* (2006.01)
  *H01M 10/052* (2010.01)

(52) U.S. Cl.
  CPC ............... *H01M 4/62* (2013.01); *H01M 4/625* (2013.01); *B60L 2200/30* (2013.01); *B60L 2260/28* (2013.01); *H01M 4/366* (2013.01); *H01M 10/052* (2013.01); *Y02T 10/705* (2013.01); *Y02T 10/7005* (2013.01); *Y02T 10/7011* (2013.01)

(56) References Cited

U.S. PATENT DOCUMENTS

| | | |
|---|---|---|
| 2010/0261060 A1 | 10/2010 | Choy et al. |
| 2010/0261063 A1 | 10/2010 | Kitagawa et al. |
| 2011/0012067 A1 | 1/2011 | Kay |
| 2011/0091772 A1* | 4/2011 | Mishima et al. ............ 429/221 |

FOREIGN PATENT DOCUMENTS

| | | | |
|---|---|---|---|
| JP | 2001-110414 A | | 4/2001 |
| JP | 2006-66081 A | | 3/2006 |
| JP | 2006-339104 | | 12/2006 |
| JP | 2008-542979 A | | 11/2008 |
| JP | 2009-140876 A | | 6/2009 |
| JP | 2010-161038 A | | 7/2010 |
| JP | 2012-506363 A | | 3/2012 |
| KR | 10-2007-0091456 A | | 9/2007 |
| KR | 10-2007-0108664 | * | 11/2007 |
| KR | 10-2008-0034844 A | | 4/2008 |
| KR | 10-2008-0083237 A | | 9/2008 |
| KR | 10-0939647 B1 | | 2/2010 |
| KR | 10-2010-0036627 A | | 4/2010 |
| WO | WO 2007/094644 A1 | | 8/2007 |
| WO | WO 2009/075289 A1 | | 6/2009 |
| WO | WO 2009/122686 | * | 10/2009 |
| WO | WO 2009/144600 A3 | | 12/2009 |

OTHER PUBLICATIONS

International Search Report for PCT/KR2011/002829 dated Feb. 6, 2012.

Extended European Search Report isaued in European Patent Application No. 11772219.9 on Jul. 5, 2015.

* cited by examiner

CARBON-COATED LITHIUM IRON PHOSPHATE OF OLIVINE CRYSTAL STRUCTURE AND LITHIUM SECONDARY BATTERY USING THE SAME

CROSS REFERENCE TO RELATED APPLICATIONS

This application is a Continuation of PCT International Application No. PCT/KR2011/002829 filed on Apr. 20, 2011, which claims priority under 35 U.S.C. 119(a) to Application No. 10-2010-0036760 filed in Republic of Korea on Apr. 21, 2010, all of which are hereby expressly incorporated by reference into the present application.

TECHNICAL FIELD

The present invention relates to lithium iron phosphate having an olivine crystal structure. More specifically, the present invention relates to lithium iron phosphate having an olivine crystal structure, wherein the lithium iron phosphate has a composition represented by the following Formula 1 and carbon (C) is coated on the surface of the lithium iron phosphate by chemical bonding via a heterogeneous element other than carbon.

BACKGROUND ART

Technological development and increased demand for mobile equipment have led to a rapid increase in the demand for secondary batteries as energy sources. Among these secondary batteries, lithium secondary batteries having high energy density and voltage, long lifespan and low self-discharge are commercially available and widely used.

The lithium secondary batteries generally use a carbon material as an anode active material. Also, the use of lithium metals, sulfur compounds, silicon compounds, tin compounds and the like as the anode active material have been considered. Meanwhile, the lithium secondary batteries generally use lithium cobalt composite oxide ($LiCoO_2$) as a cathode active material. Also, the use of lithium-manganese composite oxides such as $LiMnO_2$ having a layered crystal structure and $LiMn_2O_4$ having a spinel crystal structure and lithium nickel composite oxide ($LiNiO_2$) as the cathode active material has been considered.

$LiCoO_2$ is currently used owing to superior physical properties such as cycle life, but has disadvantages of low stability and high-cost due to use of cobalt, which suffers from natural resource limitations, and limitations of mass-use as a power source for electric automobiles. $LiNiO_2$ is unsuitable for practical application to mass-production at a reasonable cost due to many features associated with preparation methods thereof. Lithium manganese oxides such as $LiMnO_2$ and $LiMn_2O_4$ have a disadvantage of short cycle life.

In recent years, methods to use lithium transition metal phosphate as a cathode active material have been researched. Lithium transition metal phosphate is largely divided into $Li_xM_2(PO_4)_3$ having a Nasicon structure and $LiMPO_4$ having an olivine structure, and is found to exhibit superior high-temperature stability, as compared to conventional $LiCoO_2$. To date, $Li_3V_2(PO_4)_3$ is the most widely known Nasicon structure compound, and $LiFePO_4$ and $Li(Mn, Fe)PO_4$ are the most widely known olivine structure compounds.

Among olivine structure compounds, $LiFePO_4$ has a high output voltage of 3.5V and a high theoretical capacity of 170 mAh/g, as compared to lithium (Li), exhibits superior high-temperature stability, as compared to cobalt (Co), and utilizes cheap Fe as an ingredient, thus being highly applicable as the cathode active material for lithium secondary batteries.

Among olivine structure compounds, $LiFePO_4$ has a high output voltage of 3.5V, a high volume density of 3.6 $g/cm^3$, and a high theoretical capacity of 170 mAh/g, as compared to lithium (Li), and exhibits superior high-temperature stability, as compared to cobalt (Co), and utilizes cheap Fe as an ingredient, thus being highly applicable as a cathode active material for lithium secondary batteries.

However, $LiFePO_4$ disadvantageously causes an increase in internal resistance of batteries due to low electrical conductivity, when used as a cathode active material. For this reason, when battery circuits are closed, polarization potential increases, thus decreasing battery capacity.

In order to solve these problems, Japanese Patent Application Publication No. 2001-110414 suggests incorporation of conductive materials into olivine-type metal phosphates in order to improve conductivity.

However, $LiFePO_4$ is commonly prepared using $Li_2CO_3$ or LiOH as a lithium source, by solid state methods, hydrothermal methods and the like. Lithium sources and carbon sources added to improve conductivity disadvantageously cause a great amount of $Li_2CO_3$. Such $Li_2CO_3$ is degraded during charging, or reacts with an electrolyte solution to produce $CO_2$ gas, thus disadvantageously causing production of a great amount of gas during storage or cycles. As a result, disadvantageously, swelling of batteries is generated and high-temperature stability is deteriorated.

In addition, the related patents by the H.Q company disclose physically coating carbon on $LiFePO_4$ However, when surface coating is simply performed through physical bonding, uniform coating is impossible, as can be seen from the following Test Example.

Specifically, since oxygen is present on the surface of olivine-structure particles, and oxygen and carbon cannot be present on the surface though chemical bonding, if they are chemically bonded to each other, they are converted into CO or $CO_2$ gas and cannot be present on the surface of particles. Accordingly, when carbon coating is performed on the olivine particle surface in a simple physical manner, bonding force is considerably weak and the coating may be readily separated even by a slight impact. In particular, in the process of mixing an electrode slurry, active materials and carbon are separated, and, as a result, the results obtained when excess conductive material is added to the electrode occur. This may cause a deterioration in electrode density.

Accordingly, in order to improve conductivity of $LiFePO_4$, there is an increasing need for techniques in which carbon coating is uniform and active materials and carbon are not separated from each other during slurry mixing.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present invention have discovered that, when carbon (C) is chemically bonded to lithium iron phosphate having an olivine crystal structure, carbon can be uniformly coated on the surface of an active material in the form of a thin film and is not separated in the process of slurry mixing. Based on this discovery, the present invention has been completed.

Technical Solution

In accordance with one aspect of the present invention, provided is lithium iron phosphate having an olivine crystal structure, wherein the lithium iron phosphate has a composition represented by the following Formula 1 and carbon (C) is coated on the surface of the lithium iron phosphate by chemical bonding via a heterogeneous element other than carbon.

$$Li_{1+a}Fe_{1-x}M_x(PO_{4-b})X_b \quad (1)$$

wherein

M is at least one selected from Al, Mg, Ni, Co, Mn, Ti, Ga, Cu, V, Nb, Zr, Ce, In, Zn and Y, X is at least one selected from F, S and N, and $$-0.5 \leq a \leq +0.5, \ 0 \leq x \leq 0.5, \ 0 \leq b \leq 0.1.$$

The olivine-type lithium iron phosphate according to the present invention can exhibit high electrical conductivity due to uniform coating, prevent separation in the process of manufacturing electrodes due to strong bonding force and accomplish desired electrical conductivity in spite of being used in a small amount, thus enhancing electrode density, since carbon is coated on the surface thereof through chemical bonding.

Any compound may be used as an olivine-type lithium iron phosphate according to the present invention so long as it satisfies the condition of the following formula 1 and a representative example thereof is $LiFePO_4$.

The carbon (C) is preferably coated in an amount of 0.01 to 10% by weight, based on the weight of the lithium iron phosphate. When the content of carbon is excessive, the amount of active material relatively decreases, capacity disadvantageously decreases and electrode density is disadvantageously deteriorated. On the other hand, when the content of carbon is excessively small, disadvantageously, desired electrical conductivity cannot be obtained. The amount of coated carbon is more preferably 0.03 to 7% by weight.

In addition, carbon is preferably uniformly coated on the surface of lithium iron phosphate to a thickness of 2 to 10 nm. When carbon is excessively thickly coated on the surface of lithium iron phosphate, it may interfere with intercalation and deintercalation of lithium ions, and on the other hand, an excessively thin coating cannot secure uniform coating and cannot provide desired electrical conductivity. A more preferred coating thickness may be 3 to 7 nm.

The chemical bonding is preferably not ionic bonding, but covalent bonding.

When carbon is coated on the surface of lithium iron phosphate through chemical bonding, unlike physical coating, advantageously, carbon can be uniformly coated in the form of a thin film on the surface of lithium iron phosphate and is not separated in the process of manufacturing electrodes.

Generally, it is considerably difficult to chemically bond carbon to the surface of a metal or metal oxide. In addition, in lithium metal oxides such as lithium iron phosphate, the end of oxide is generally composed of oxygen and lithium metal oxide evaporates in the form of CO or $CO_2$, when chemically bonded to carbon.

Accordingly, according to the present invention, carbon is chemically bonded to the surface of lithium iron phosphate through a heterogeneous element. Any element may be used as the heterogeneous element without particular limitation so long as it is not separated from the surface of lithium iron phosphate under vacuum, when chemically bonded to oxygen, and do not impair actions of a secondary battery comprising lithium iron phosphate, and is preferably sulfur (S). In this case, as an active material, lithium iron phosphate may be chemically bonded to carbon (a material to be coated) for example in the form of "oxygen-sulfur-carbon".

The sulfur (S) serving as a bridge between carbon and lithium iron phosphate is for example derived from a precursor for preparation of lithium iron phosphate. When $FeSO_4$ is used for preparation of lithium iron phosphate, sulfur may remain in the product after reaction. Generally, when sulfur remains in the active material, repeated washing processes are required in order to remove the sulfur.

On the other hand, according to the present invention, the remaining sulfur (S) may be used for carbon coating. For example, since carbon is coated after a predetermined amount of sulfur remains on the surface of lithium iron phosphate by reducing the number of the washing process or washing intensity, in addition to the effect obtained by carbon coating based on chemical bonding, simplification of washing process can be realized and preparation costs of active material can be thus reduced. In particular, when primary particles of lithium iron phosphate are nanomaterials, filtering is not easy during washing. Accordingly, by limiting the washing process, the overall efficiency of secondary battery fabrication can be further improved.

In another embodiment, the sulfur (S) may be incorporated by coating lithium iron phosphate with a sulfur-containing compound. The sulfur-containing compound may be one or more selected from sulfides, sulfites and sulfates.

The sulfur may be contained in an amount of 0.005 to 1% by weight, based on the total weight of the lithium iron phosphate.

When the content of sulfur is excessively high, electrical conductivity of active material as well as the density of electrode may be deteriorated and, on the other hand, when the content of sulfur is excessively low, sufficient chemical bonding between lithium iron phosphate and carbon may be disadvantageously impossible. A more preferred sulfur content may be 0.01 to 0.7% by weight.

The present invention provides a method for preparing the olivine-type lithium iron phosphate.

In a preferred embodiment, the olivine-type lithium iron phosphate may be prepared by a method comprising:

(a) primarily mixing precursors as starting materials and an alkalinizing agent;

(b) secondarily mixing the mixture of step (a) with supercritical or subcritical water to synthesize lithium iron phosphate;

(c) mixing the synthesized lithium iron phosphate with a carbon precursor and drying the mixture; and (d) heating the mixture of lithium iron phosphate and the carbon precursor.

In step (a), as a lithium precursor, one of the ingredients, $Li_2CO_3$, $Li(OH)$, $Li(OH).H_2O$, $LiNO_3$ or the like may be used. As an iron (Fe) precursor, a compound containing at least a sulfur ingredient so that sulfur is left on the surface of the produced lithium iron phosphate such as $FeSO_4$, $FeC_2O_4.2H_2O$ or $FeCl_2$ may be used. $FeSO_4$ is particularly preferred since it contains a sulfur element. As a phosphorus (P) precursor, an ammonium salt such as $H_3PO_4$, $NH_4H_2PO_4$, $(NH_4)_2HPO_4$ or $P_2O_5$ may be used. In addition, examples of the alkalinizing agent include alkali metal hydroxide, alkaline earth metal hydroxide, an ammonia compound and the like.

In step (b), the supercritical or subcritical water may be water at a pressure of 180 to 550 bar at 200 to 700□ and the heating temperature in step (d) may be 600 to 1200□.

Any carbon precursor may be used so long as it can produce carbon during a baking process under a reduced atmosphere. Preferably, the carbon precursor may be a polyol-type carbon-containing precursor and non-limiting examples thereof include sucrose, cellulose, glucose and the like.

In another embodiment, the olivine-type lithium iron phosphate may be prepared by a method comprising:

(a') primarily mixing precursors as starting materials and an alkalinizing agent;

(b') secondarily mixing the mixture of step (a') with supercritical or subcritical water to synthesize lithium iron phosphate, followed by drying;

(c') heating the synthesized lithium iron phosphate; and (d') milling the lithium iron phosphate and a carbon powder.

In step (d'), the milling method is well-known in the art and a detailed explanation thereof is thus omitted. In a preferred embodiment, the milling method may be ball milling.

In step (d) or (c', the heating may be carried out under an inert gas atmosphere. Any inert gas may be used without particular limitation so long as it has low reactivity. Preferred examples thereof include Ar, $N_2$ and the like.

The lithium iron phosphate according to the present invention may be in the form of a primary particle or a secondary particle. The lithium iron phosphate in the form of a secondary particle may be prepared by drying a mixture of a primary particle having a predetermined particle diameter, a binder and a solvent, followed by aggregating.

In the mixture, preferably, the primary particle is present in an amount of 5 to 20 wt % with respect to the weight of the solvent and the binder is present in an amount of 5 to 20 wt % with respect to the weight of the solvent. By controlling a ratio of the primary particle and the solvent, an internal porosity of the secondary particle can be controlled. Examples of solvent that can be used during the process include all organic solvents of polar solvents such as water and non-polar solvents. In addition, examples of the binder used in the step include, but are not limited to, sucrose and lactose-based sugars, PVDF- or PE-based polymers and cokes which are soluble in a polar solvent.

The dying and preparation of the secondary particles may be carried out at the same time by various methods known in the art, including spray drying, fluidized-bed drying, vibration drying, etc. In particular, rotating spray drying is preferred, because it enables preparation of secondary particles in the form of spheres and thus improves tap density.

The drying may be carried out at 120 to 200□ under inert gas (e.g., Ar, N2) atmosphere.

Also, the olivine-type lithium iron phosphate according to the present invention is preferably prepared by a coprecipitation or solid phase method.

In another embodiment, the olivine-type lithium iron phosphate according to the present invention may be prepared by a method comprising:

(a") synthesizing lithium iron phosphate using precursors as starting materials by a coprecipitation or solid phase method;

(b") adding the synthesized lithium iron phosphate to a dispersion bath containing a sulfur-containing compound, followed by stirring;

(c") drying the mixture obtained in step (b"), followed by baking; and (d") mixing the lithium iron phosphate obtained in step (c") with a carbon powder, followed by milling, or mixing the calcinized lithium iron phosphate and a carbon precursor with a solvent, followed by drying and baking.

The coprecipitation or solid phase method in step (a") is well-known in the art and a detailed explanation thereof is thus omitted.

The sulfur-containing compound used for step (b") may be sulfide, sulfite, sulfate or the like, as mentioned above and may be used within an amount of sulfur that is suggested in the present invention.

The present invention provides a cathode mix comprising lithium iron phosphate that is coated with carbon by a chemical method, as a cathode active material. The cathode mix may optionally contain, in addition to the cathode active material, a conductive material, a binder, a filler and the like.

The conductive material is commonly added in an amount of 1 to 30% by weight, based on the total weight of the mixture comprising the cathode active material. Any conductive material may be used without particular limitation so long as it has suitable conductivity without causing adverse chemical changes in the battery. Examples of conductive materials include conductive materials, including graphite; carbon blacks such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and polyphenylene derivatives.

The binder is a component which enhances binding of an electrode active material to a conductive material and current collector. The binder is commonly added in an amount of 1 to 30% by weight, based on the total weight of the mixture comprising the cathode active material. Examples of the binder include polyvinylidene, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubbers, fluororubbers and various copolymers.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

Meanwhile, the cathode active material may be composed of only the olivine-type lithium iron phosphate and a combination of olivine-type lithium iron phosphate and lithium-containing transition metal oxide, if necessary.

Examples of the lithium transition metal composite oxide include, but are not limited to, layered compounds such as lithium cobalt oxide ($LiCoO_2$) and lithium nickel oxide ($LiNiO_2$), or compounds substituted with one or more transition metals; lithium manganese oxides such as compounds of formula $Li_{1+y}Mn_{2-y}O_4$ ($0 \leq y \leq 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithiated nickel oxides of Formula $LiNi_{1-y}M_yO_2$ (M=Co, Mn, Al, Cu, Fe, Mg, B or Ga, and $0.01 \leq y \leq 0.3$); lithium manganese composite oxides of Formula $LiMn_{2-y}M_yO_2$ (M=Co, Ni, Fe, Cr, Zn or Ta, and $0.01 \leq y \leq 0.1$), or formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$.

The present invention provides a cathode wherein the cathode mix is applied to a collector.

The cathode for secondary batteries may be prepared by applying a slurry obtained by mixing the cathode mix with a solvent such as NMP to a cathode current collector, followed by drying and press-rolling.

The cathode current collector is generally fabricated to have a thickness of 3 to 500 µm. There is no particular limit as to the cathode current collector, so long as it has suitable conductivity without causing adverse chemical changes in the fabricated battery. Examples of the cathode current collector include stainless steel, aluminum, nickel, titanium, sintered carbon, and aluminum or stainless steel which has been surface-treated with carbon, nickel, titanium or silver. If necessary, these current collectors may also be processed to form fine irregularities on the surface thereof so as to enhance adhesive strength to the cathode active materials. In addition, the current collectors may be used in various forms including films, sheets, foils, nets, porous structures, foams and non-woven fabrics.

The present invention provides a lithium secondary battery comprising the cathode, the anode, a separator, and a lithium salt-containing non-aqueous electrolyte.

For example, the anode is prepared by applying an anode mix comprising an anode active material to an anode current collector, followed by drying. The anode mix may comprise the afore-mentioned ingredients, i.e., the conductive material, the binder and the filler, if necessary.

The anode current collector is generally fabricated to have a thickness of 3 to 500 µm. There is no particular limit as to the anode current collector, so long as it has suitable conductivity without causing adverse chemical changes in the fabricated battery. Examples of the anode current collector include copper, stainless steel, aluminum, nickel, titanium, sintered carbon, and copper or stainless steel which has been surface-treated with carbon, nickel, titanium or silver, and aluminum-cadmium alloys. Similar to the cathode current collector, if necessary, these current collectors may also be processed to form fine irregularities on the surface thereof so as to enhance adhesive strength to the anode active materials. In addition, the current collectors may be used in various forms including films, sheets, foils, nets, porous structures, foams and non-woven fabrics.

Examples of the anode active material include carbon and graphite materials such as natural graphite, artificial graphite, expanded graphite, carbon fiber, hard carbon, carbon black, carbon nanotubes, perylene, activated carbon; metals alloyable with lithium, such as Al, Si, Sn, Ag, Bi, Mg, Zn, In, Ge, Pb, Pd, Pt and Ti and compounds containing these elements; composites of carbon and graphite materials with a metal and a compound thereof; and lithium-containing nitrides. Of these, a carbon-based active material, a silicon-based active material, a tin-based active material, or a silicon-carbon-based active material is more preferred. The material may be used alone or in combination of two or more thereof.

The separator is interposed between the cathode and anode. As the separator, an insulating thin film having high ion permeability and mechanical strength is used. The separator typically has a pore diameter of 0.01 to 10 µm and a thickness of 5 to 300 µm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt. As the non-aqueous electrolyte, a non-aqueous electrolyte solution, solid electrolyte and inorganic solid electrolyte may be utilized.

Examples of the non-aqueous electrolyte solution that can be used in the present invention include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte utilized in the present invention, include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further contain halogen-containing solvents such as carbon tetrachloride and ethylene trifluoride. Further, in order to improve high-temperature storage characteristics, the non-aqueous electrolyte may further contain carbon dioxide gas or the like and may further contain fluoro-ethylene carbonate (FEC), propene sultone (PRS), fluoro-ethlene carbonate (FEC) and the like.

The lithium secondary batteries according to the present invention may be used as unit batteries of batter modules, which are power sources of medium and large devices requiring high-temperature stability, long cycle properties and high rate properties.

Preferably, examples of medium and large devices include power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes), electric scooters (E-scooter); electric golf carts and the like.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, the present invention will be described in more detail with reference to the following examples. These examples are provided only to illustrate the present invention and should not be construed as limiting the scope and spirit of the present invention.

Example 1

A first fluid stream containing an aqueous solution of iron sulfate, phosphoric acid and sugar and a second fluid stream containing a mixture of ammonia and an aqueous lithium hydroxide solution were pumped under pressurization at a rate of 5 ml/min and a pressure of 270 bar, a fourth fluid stream containing 460□ ultrapure water was pumped under pressurization to a third fluid stream supplied from the first reactor at a rate of 100 ml/min at the same pressure, followed by mixing in a second reactor.

In the first fluid stream, the mixed aqueous solution consists of 22 parts by weight of iron sulfate and 9 parts by weight of phosphoric acid (84 wt %), and 10% by weight of sugar is contained, based on the weight of iron sulfate. The second fluid stream consists of 1.4% by weight of ammonia and 6.5% by weight of aqueous lithium hydroxide.

The mixture obtained from the second reactor was allowed to stand in an about 400□ third reactor for 10 seconds, cooled, concentrated, and spray-dried at 130□, to prepare a precursor.

A washing process was simply performed so that sulfur remained in the precursor thus prepared, and baked under a nitrogen atmosphere at 700□ for 11 hours to prepare lithium iron phosphate in which carbon is coated through sulfur (S) by chemical bonding.

Example 2

Iron sulfate and phosphoric acid were dissolved in distilled water at an equivalent ratio enabling $HFePO_4$ to be obtained, and $HFePO_4$ was synthesized while increasing basicity (pH) of the obtained aqueous solution under the condition that sulfur remains in the process of obtaining a precipitate by a coprecipitation method. The $HFePO_4$ thus synthesized was mixed with lithium carbonate and sugar, followed by spray-drying to prepare precursor particles, the precursor particles were baked under a nitrogen atmosphere at 700□ for 11 hours, to prepare lithium iron phosphate in which carbon is coated by chemical bonding through sulfur (S).

Comparative Example 1

Lithium iron phosphate (P2 model, manufactured by the company H.Q) was obtained. As can be seen from the instruction manual of the product, 2.2% by weight of carbon is coated on the surface of lithium iron phosphate.

Comparative Example 2

Lithium iron phosphate was prepared in the same manner as in Example 1 except that sugar was not added after the precursor was prepared.

Test Example 1

Figure 1:
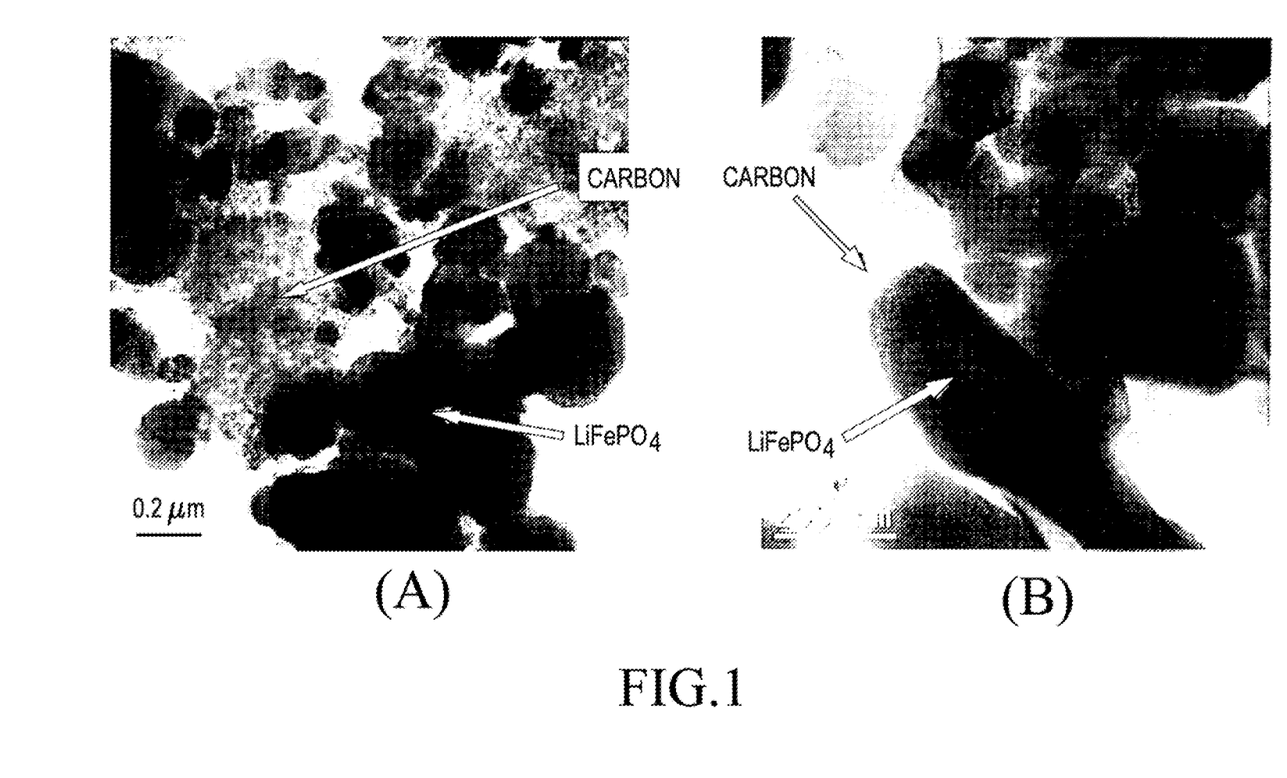
FIG. 1 is an SEM image (A) of lithium iron phosphate particles of Comparative Example 1 which are coated with carbon by physical bonding in Test Example 1 and an SEM image (B) of lithium iron phosphate particles which are coated with carbon by chemical bonding in Test Example 1.

The lithium iron phosphate particles of Comparative Example 1 and lithium iron phosphate particles of Example 1 were measured by a microscope. The results are shown in FIG. 1.

It can be seen that, in olivine-type lithium iron phosphate (A) of Comparative Example 1 in which carbon is coated on particle surfaces by physical bonding, carbon clumps were present between particles and carbon was not uniformly coated. The case in which carbon clumps are present means that a great amount of carbon that cannot contribute to electrical conductivity is present, thus causing a decrease in capacity and density of batteries corresponding to the amount of carbon.

On the other hand, it can be seen that, in lithium iron phosphate (B) of Example 1 in which carbon is coated on the particle surface by chemical bonding, carbon was uniformly coated on the surface in the form of a thin film and carbon clumps and the like were not present.

Test Example 2

Figure 2:
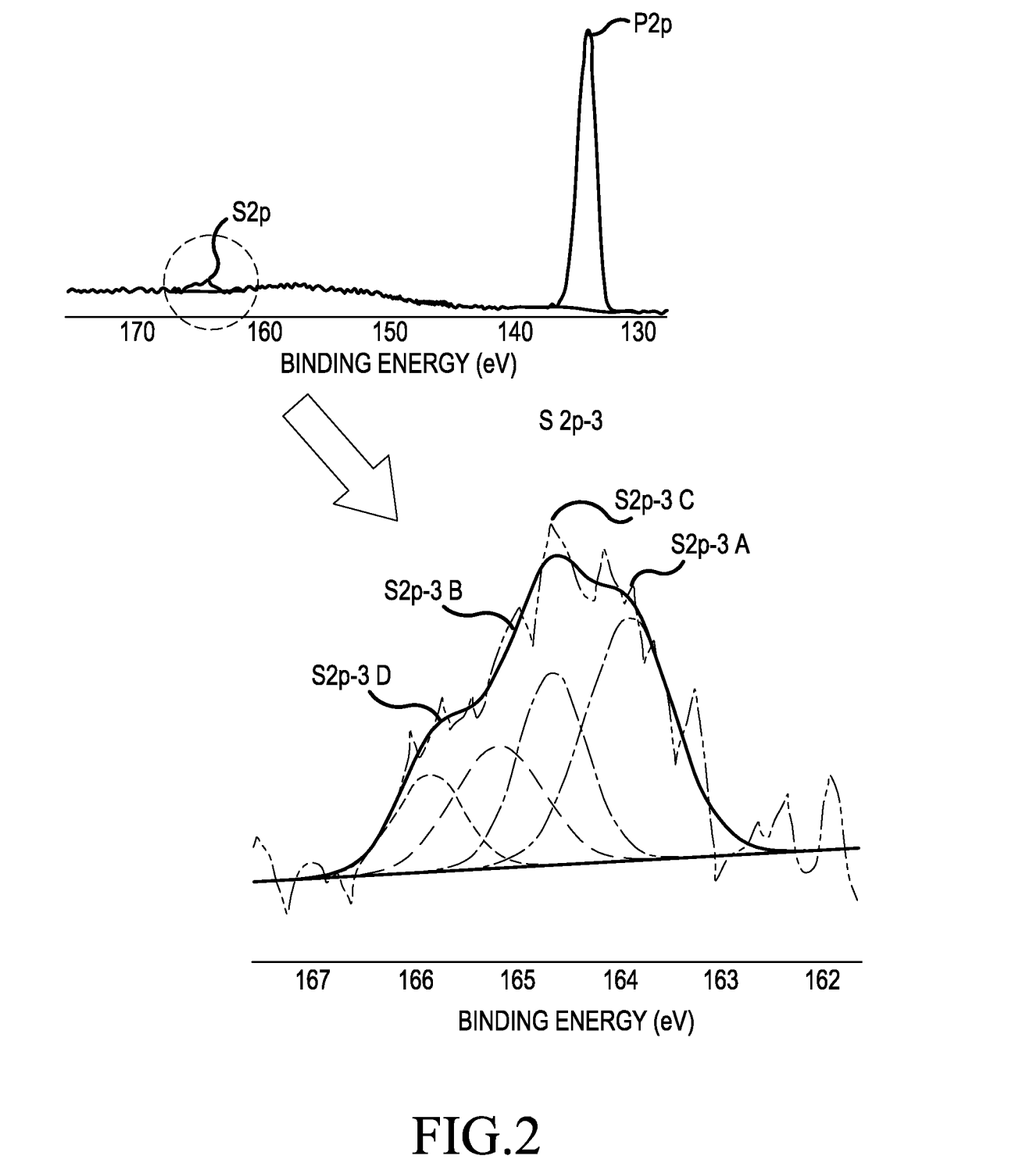
FIG. 2 is a graph showing XPS analysis results of lithium iron phosphate of Example 1 in Test Example 2.

In order to confirm a bonding state between carbon and sulfur, lithium iron phosphate of Example 1 was subjected to XPS analysis. The results are shown in FIG. 2. As can be seen from FIG. 2, as a result of XPS analysis, carbon was covalently bonded to sulfur. If sulfur is present in the form of an ionic bonding, sulfur is dissolved in an electrolyte solution during charge/discharge or at high temperatures, thus causing serious problems of batteries such as decrease in capacity and stability.

Test Example 3

The carbon amount and electrical conductivity of lithium iron phosphates of Comparative Examples 1 and 2 and Examples 1 and 2 were measured. The results are shown in the following Table 1.

TABLE 1

|  | Carbon amount | Electrical conductivity |
|---|---|---|
| Comp. Ex. 1 | 2.2 wt % | $4.4 * 10^{-2}$ |
| Comp. Ex. 2 | 0 wt % | $2.1 * 10^{-10}$ |
| Ex. 1 | 1.9 wt % | $3.2 * 10^{-1}$ |
| Ex. 2 | 2.0 wt % | $1.3 * 10^{-1}$ |

As can be seen from Table 1, lithium iron phosphate of Comparative Example 2 in which carbon was not coated exhibited considerably low electrical conductivity. It can be seen that the lithium iron phosphate of Examples 1 and 2 according to the present invention exerted high electrical conductivity, although they contained a smaller amount of carbon as compared to lithium iron phosphate of Comparative Example 1.

Test Example 3

Lithium iron phosphates of Comparative Example 1 and Example 1 were added to a 500 mL beaker, 200 mL of water was added thereto, and the mixture was vigorously stirred for 5 minutes, and allowed to stand for 10 minutes. Then, variations were measured. Images associated with the measured results are shown in FIGS. 3 and 4.

Figure 3:
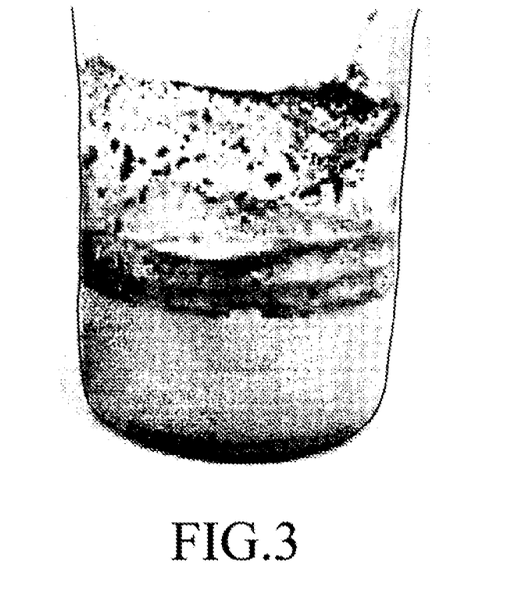
FIG. 3 is an image showing results after lithium iron phosphate of Comparative Example 1 is stirred in a solvent in Test Example 3.
Figure 4:
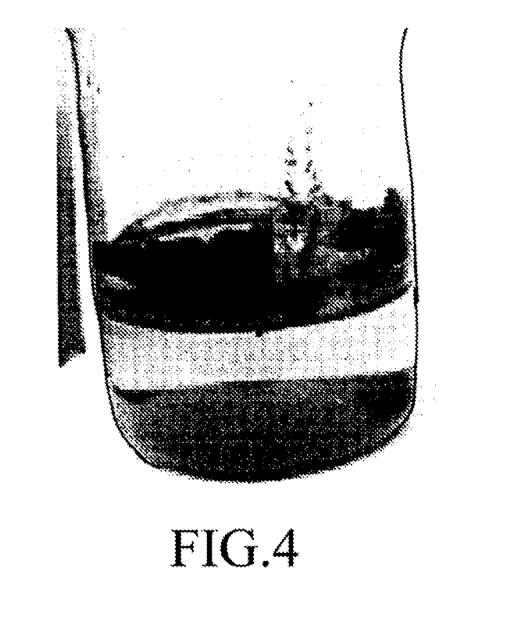
FIG. 4 is an image showing results after lithium iron phosphate of Example 1 is stirred in a solvent in Test Example 3.

As can be seen from FIG. 3, in the lithium iron phosphate of Comparative Example 1, lithium iron phosphate was completely separated from carbon and gray $LiFePO_4$ was precipitated. On the other hand, in lithium iron phosphate of Example 1 according to the present invention, lithium iron phosphate was not separated from carbon, since carbon was coated on the surface of lithium iron phosphate by strong chemical bonding.

Example 3

95% by weight of lithium iron phosphate prepared in Example 1, as a cathode active material, 2.5% by weight of Super-P as a conductive material and 2.5% by weight of PVdF as a binder were added to NMP, to prepare a cathode mixture slurry. The slurry was coated on one surface of an aluminum foil, followed by drying and pressing, to manufacture a cathode.

An electrode assembly in which Cell Guard™ as a separator is interposed between Li metal foils as the cathode and the anode was manufactured, and a lithium non-aqueous electrolyte solution containing 1M $LiPF_6$ was added to a mixed solvent of cyclic and linear carbonates to manufacture a battery.

Example 4

A battery was fabricated in the same manner as in Example 3 except that lithium iron phosphate prepared in Example 2 was used as a cathode active material.

Comparative Example 3

A battery was fabricated in the same manner as in Example 3 except that lithium iron phosphate of Comparative Example 1 was used as a cathode active material.

Comparative Example 4

A battery was fabricated in the same manner as in Example 3 except that lithium iron phosphate of Comparative Example 2 was used as a cathode active material.

Test Example 4

The capacities of batteries of Examples 3 and 4 and Comparative Examples 3 and 4 were measured. The results are shown in the following Table 2.

TABLE 2

| | Capacity of batteries |
|---|---|
| Ex. 3 | 160 mAh/g |
| Ex. 4 | 157 mAh/g |
| Comp. Ex. 3 | 154 mAh/g |
| Comp. Ex. 4 | 62 mAh/g |

As can be seen from Table 2, although the batteries of Example 3 and 4 contain a smaller amount of carbon, as compared to the battery of Comparative Example 3, such carbon is firmly bonded by chemical bonding. For this reason, the batteries exhibit superior electrochemical properties.

Test Example 5

Figure 5:
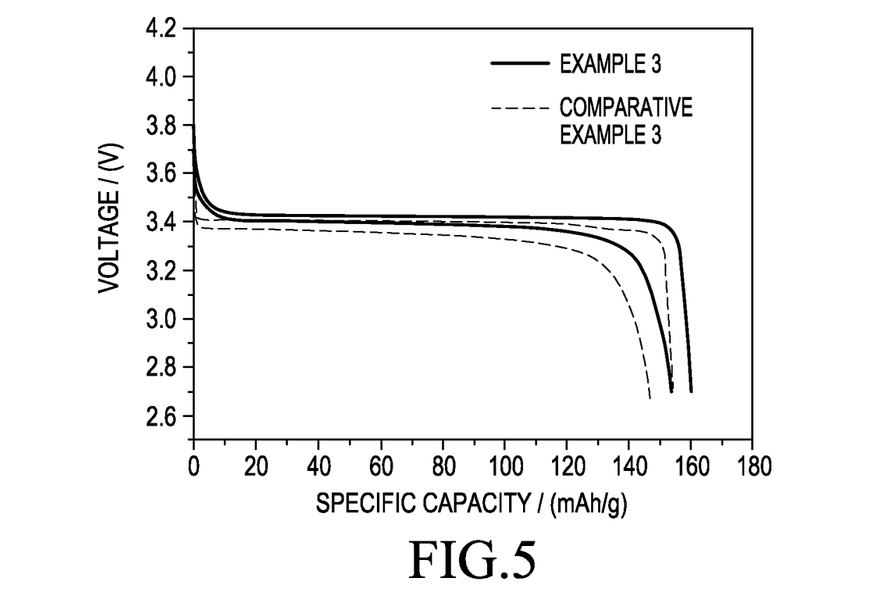
FIG. 5 is a graph showing 0.1 C and 1 C discharge profiles with respect to the battery of Example 4 and the battery of Comparative Example 4 in Test Example 5.

With respect to the battery of Example 4 and the battery of Comparative Example 4, variations were measured under 0.1 C and 1 C discharge conditions. The results are shown in FIG. 5. Discharge states were measured at 1st cycles and $50^{th}$ cycles. The results are shown in FIG. 6.

Figure 6:
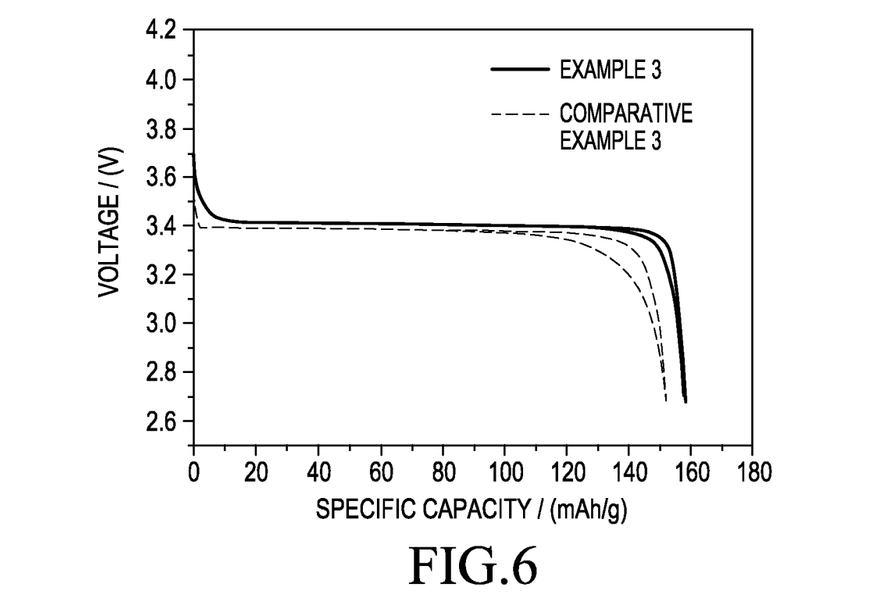
FIG. 6 is a graph showing discharge profiles at $1^{st}$ and $50^{th}$ cycles with respect to the battery of Example 4 and the battery of Comparative Example 4 in Test Example 5.

As can be seen from FIGS. 5 and 6, the battery of Example 4 inhibited IR drop due to chemical bonding of carbon, thus increasing discharge profiles. In particular, the battery of Example 4 exhibited a small increase in resistance at $50^{th}$ cycle, as compared to the battery of Comparative Example 4. The reason for this is thought to be that, although not clearly found, conductivity increases due to presence of carbon through a high bonding force, and/or negative reactivity with an electrolyte solution is inhibited and resistance is decreased through uniform coating.

Accordingly, the compound according to the present invention enables fabrication of batteries in which power characteristics are important and an increase in resistance is small even after cycles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the afore-going, the olivine-type lithium iron phosphate according to the present invention has a structure in which carbon is coated on lithium iron phosphate by chemical bonding, thus advantageously enabling uniform thin film coating on the surface of active materials, being not readily separated in the process of fabricating electrodes and exhibiting superior conductivity and density.

The invention claimed is:

1. Lithium iron phosphate having an olivine crystal structure suitable for lithium secondary battery, wherein the lithium iron phosphate has a composition represented by the following Formula 1 and carbon (C) is coated on the surface of the lithium iron phosphate by chemical bonding via sulfur (S) in form of 'oxygen-sulfur-carbon', and wherein the sulfur (S) is contained in the lithium iron phosphate in an amount of 0.005 to 1% by weight, based on the total weight of the lithium iron phosphate:

$$Li_{1+a}Fe_{1-x}M_x(PO_{4-b})X_b \qquad (1)$$

wherein

M is at least one selected from Al, Mg, Ni, Co, Mn, Ti, Ga, Cu, V, Nb, Zr, Ce, In, Zn and Y, X is at least one selected from F, S and N, $-0.5 \leq a \leq +0.5, 0 \leq x \leq 0.5, 0 \leq b \leq 0.1$.

2. The lithium iron phosphate according to claim 1, wherein the lithium iron phosphate is $LiFePO_4$.

3. The lithium iron phosphate according to claim 1, wherein the carbon is coated at an amount of 0.01 to 10% by weight, based on the total weight of the lithium iron phosphate.

4. The lithium iron phosphate according to claim 1, wherein the carbon is coated on the surface of lithium iron phosphate to a thickness of 2 to 10 nm.

5. The lithium iron phosphate according to claim 1, wherein the sulfur (S) is derived from a precursor for preparation of lithium iron phosphate.

6. The lithium iron phosphate according to claim 1, wherein the sulfur (S) is incorporated by coating lithium iron phosphate with a sulfur-containing compound.

7. The lithium iron phosphate according to claim 6, wherein the sulfur-containing compound is one or more selected from sulfides, sulfites and sulfates.

8. The lithium iron phosphate according to claim 1, wherein the lithium iron phosphate is prepared by a supercritical hydrothermal method.

9. A method for preparing the lithium iron phosphate according to claim 1 comprising:
 (a) primarily mixing precursors as starting materials and an alkalinizing agent;
 (b) secondarily mixing the mixture obtained in step (a) with supercritical or subcritical water to synthesize lithium iron phosphate;
 (c) mixing the synthesized lithium iron phosphate with a carbon precursor and drying the mixture; and
 (d) heating the mixture of lithium iron phosphate and the carbon precursor.

10. A method for preparing the lithium iron phosphate according to claim 1 comprising:
 (a') primarily mixing precursors as starting materials and an alkalinizing agent;
 (b') secondarily mixing the mixture obtained in step (a') with supercritical or subcritical water to synthesize lithium iron phosphate, followed by drying;
 (c') heating the synthesized lithium iron phosphate; and
 (d') milling the lithium iron phosphate and a carbon powder.

11. The method according to claim 9, wherein the heating is carried out under an inert gas atmosphere.

12. A method for preparing the lithium iron phosphate according to claim 1 comprising:
 (a") synthesizing lithium iron phosphate using precursors as starting materials by a coprecipitation or solid phase method;
 (b") adding the synthesized lithium iron phosphate to a dispersion bath containing a sulfur-containing compound, followed by stirring;
 (c") drying the mixture obtained in step (b"), followed by baking; and
 (d") mixing the dried/baked lithium iron phosphate with a carbon powder, followed by milling, or mixing the dried/baked lithium iron phosphate and carbon precursor with a solvent, followed by drying and baking.

13. A cathode mix comprising the lithium iron phosphate according to claim 1 as a cathode active material.

14. A lithium secondary battery comprising a cathode in which the cathode mix according to claim 13 is applied to a current collector.

15. The lithium secondary battery according to claim 14, wherein the lithium secondary battery is used as a unit battery of a battery module that is a power of a medium to large device.

16. The lithium secondary battery according to claim 15, wherein the medium to large device is a power tool, an electric vehicle, a hybrid electric vehicle, or an electric golf cart.

17. The method according to claim 10, wherein the heating is carried out under an inert gas atmosphere.

18. The lithium iron phosphate according to claim 1, wherein the sulfur (S) is contained in the lithium iron phosphate in an amount of 0.01 to 0.7% by weight, based on the total weight of the lithium iron phosphate.

* * * * *